United States Patent
Oshiumi et al.

(10) Patent No.: US 11,898,059 B2
(45) Date of Patent: *Feb. 13, 2024

(54) SURFACE PROTECTION COMPOSITION AND TERMINAL FITTED ELECTRIC WIRE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, NATIONAL UNIVERSITY CORPORATION, Fukuoka (JP)

(72) Inventors: Naoyuki Oshiumi, Yokkaichi (JP); Takehiro Hosokawa, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, NATIONAL UNIVERSITY CORPORATION, Fukuoka-Shi (JP)

( * ) Notice: Subject to any disclaimer, the term of this patent is extended or adjusted under 35 U.S.C. 154(b) by 805 days.

This patent is subject to a terminal disclaimer.

(21) Appl. No.: 16/975,419

(22) PCT Filed: Feb. 25, 2019

(86) PCT No.: PCT/JP2019/007089
§ 371 (c)(1),
(2) Date: Aug. 25, 2020

(87) PCT Pub. No.: WO2019/176515
PCT Pub. Date: Sep. 19, 2019

(65) Prior Publication Data
US 2020/0392350 A1  Dec. 17, 2020

(30) Foreign Application Priority Data

Mar. 14, 2018  (JP) .................................. 2018-046112

(51) Int. Cl.
*C09D 5/08* (2006.01)
*C09D 135/02* (2006.01)
(Continued)

(52) U.S. Cl.
CPC .............. *C09D 5/086* (2013.01); *C09D 4/00* (2013.01); *C09D 5/084* (2013.01); *C09D 135/02* (2013.01);
(Continued)

(58) Field of Classification Search
CPC .......... H01B 3/44; H01B 7/02; H01B 7/2806; H01R 4/20; H01R 4/62; C09D 5/08; C09D 201/00
(Continued)

(56) References Cited

U.S. PATENT DOCUMENTS

2005/0186442 A1* 8/2005 Gros .................. C23C 28/3225
428/626
2010/0256027 A1  10/2010 Miyamoto et al.
(Continued)

FOREIGN PATENT DOCUMENTS

JP    H02-047281 A   2/1990
JP    H06-33272 A    2/1994
(Continued)

OTHER PUBLICATIONS

Apr. 9, 2019 International Search Report issued in International Patent Application No. PCT/JP2019/007089.

*Primary Examiner* — William H. Mayo, III
(74) *Attorney, Agent, or Firm* — Oliff PLC

(57) ABSTRACT

A surface protection composition having a compound represented by the formula (1) in an amount of 0.1 to 10 mass % in terms of phosphorus element with respect to the total amount of the composition, the compound (b) the metal-
(Continued)

containing compound in an amount of 0.1 to 10 mass % in terms of a metal element with the total amount of the composition or the amine compound in an amount of 0.1 to 5.0 mass % in terms of nitrogen element the total amount of the composition, the compound (c) (meth)acrylate having 2 or more carbon-carbon double bonds and hydrocarbon chains having four or more carbon atoms in an amount of 1.0 to 70 mass % with the total amount of the composition, the compound (d) a photopolymerization initiator in an amount of 0.1 to 10 mass % with the total amount of the composition.

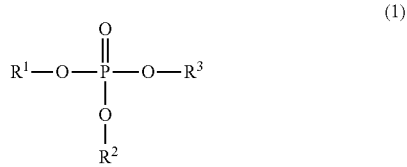

(1)

16 Claims, 2 Drawing Sheets

(51) Int. Cl.
*C23F 11/167* (2006.01)
*C23F 11/173* (2006.01)
*H01B 7/28* (2006.01)
*C09D 4/00* (2006.01)

(52) U.S. Cl.
CPC ........ *C23F 11/1676* (2013.01); *C23F 11/173* (2013.01); *H01B 7/2806* (2013.01)

(58) Field of Classification Search
USPC .................... 174/74 R, 78, 84 R, 88 R, 84 C
See application file for complete search history.

(56) References Cited

U.S. PATENT DOCUMENTS

2017/0117650 A1* 4/2017 Yoshida ................. H01R 4/185
2018/0163058 A1* 6/2018 Nakashima .......... C10M 141/10
2018/0179400 A1* 6/2018 Nakashima ............. C09D 7/40
2019/0173213 A1* 6/2019 Takata ................ C23F 11/1673

FOREIGN PATENT DOCUMENTS

JP           4811408 B2    11/2011
WO      2015/146985 A1    10/2015

* cited by examiner

SURFACE PROTECTION COMPOSITION AND TERMINAL FITTED ELECTRIC WIRE

TECHNICAL FIELD

The present application relates to a surface protection composition and a terminal fitted electric wire, and more specifically, to a surface protection composition excellent in anticorrosion property for preventing metal corrosion, and a terminal fitted electric wire excellent in anticorrosion property treated with the composition.

BACKGROUND ART

For metal equipment and metal parts, a grease is used for the purpose of lubrication and corrosion resistance. For example, Patent Literature 1 describes the use of a grease containing a perfluoroether base oil, a consistency improver, and barium sulfate or antimony oxide to machinery parts. Patent Literature 2 describes the use of a composition to protect the metal surface containing a lubricating base oil and a gelling agent.

CITATION LIST

Patent Literature

Patent Literature 1: JP 4811408 B
Patent Literature 2: JP H06-33272 A

SUMMARY OF APPLICATION

Problems to be Solved by the Application

The compositions described in Patent Literatures 1 and 2 exhibit inferior adsorption force to the metal and inferior anticorrosion performance to prevent the metal surface since the compositions do not contain metal adsorbing components. Further, a grease is also a semi-solid or solid material in which a consistency improver is dispersed in a lubricating base oil. Since the viscosity of a grease decreases greatly on heating, coating with a grease is made easier by heating. However, a grease exhibit inferior heat resistance since flowing out is made easier by heating. The composition in Patent Literature 2 has a state like a solidified agar by containing the gelling agent with the lubricating base oil, and the composition tends to become liquid easily when heated. Thus, coating with the composition is made easier by heating. It is possible to prevent the composition in Patent Literature 2 from flowing out even under the high temperature conditions by selecting gelling agents appropriately; however, if the composition is hard to flow out even under the high temperature conditions, the composition needs to be heated at a high temperature when used for coating of a metal surface. Considering the effect of heating on metal equipment or metal parts to be coated and the manufacturing cost for heating, the composition of Patent Literature 2, which utilizes change of the state with the temperature for coating and curing, does not necessarily satisfy the coating properties and heat resistance.

It is an object of the present application to provide a surface protection composition that has excellent anticorrosion performance to prevent metal corrosion, and also has excellent coating properties and heat resistance, and a terminal-fitted electric wire treated with the composition.

Solution to Problem

In order to solve the foregoing problem, the surface protection composition contains (a) a phosphorus compound represented by the following general formula (1) in an amount of 0.1 to 10 mass % in terms of phosphorus element with respect to the total amount of the composition, the compound (b) a metal-containing compound in an amount of 0.1 to 10 mass % in terms of a metal element with respect to the total amount of the composition or an amine compound in an amount of 0.1 to 5.0 mass % in terms of nitrogen element with respect to the total amount of the composition, the compound (c) a (meth)acrylate having two or more carbon-carbon double bonds and a hydrocarbon chain having four or more carbon atoms in an amount of 1.0 to 70 mass % with respect to the total amount of the composition, and (d) a photopolymerization initiator in an amount of 0.1 to 10 mass % with respect to the total amount of the composition.

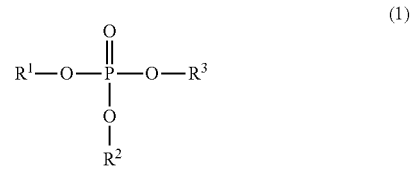

In the above-presented general formula, $R^1$ represents a hydrogen atom, $R^2$ represents a hydrocarbon group having 4 to 30 carbon atoms, and $R^3$ represents a hydrogen atom or a hydrocarbon group having 4 to 30 carbon atoms.

It is preferable that in the surface protection composition of the present application, the metal in the compound (b) is at least one selected from the group consisting of alkali metals, alkaline earth metals, aluminum, titanium, and zinc. Further at least one of the hydrocarbon groups having 4 to 30 carbon atoms in the compound (a) has one or more branched chains or one or more carbon-carbon double bonds. Further, it is preferable that a mass ratio ((a)+(b)):(c) of the total of the compound (a) and the compound (b) to the compound (c) is within a range of 98:2 to 30:70. Further, the surface protection composition according to the present application may contain a lubricating base oil (e) in an amount of 10 to 90 mass % with respect to the total amount of the composition. Further, each of the hydrocarbon group in the above-presented general formula (1) is preferably an aliphatic hydrocarbon group or an alicyclic hydrocarbon group. Further, it is preferable that (c) is a polyfunctional (meth)acrylate having an aliphatic or alicyclic hydrocarbon chain having 8 to 22 carbon atoms.

In the terminal-fitted electric wire of the present application, an electric connection part between the terminal and the electric conductor, covered with a cured product of the surface protection composition of the present application.

Advantageous Effects of Application

The surface protection composition of the present application contains (a) the compound and (b) the metal-containing compound and the amine compound. Containing the compounds, the surface protection composition is adsorbed on the coated metal surface and has excellent anticorrosion performance to prevent metal corrosion. Further, containing (c) the (meth)acrylate and (d) the photopolymerization initiator, the composition can be prepared in a liquid state before photocuring and has excellent coating properties and excellent heat resistance because the composition can be a polymer with heat resistance by photocuring. Further both the compound (a) and the compound (c) have hydrocarbon groups, each having four or more carbon atoms. Thus, since the compound (a) and the compound (c) have a high compatibility and form a uniform composition, whereby the composition has an excellent anticorrosion performance to prevent metal corrosion, excellent coating properties, and heat resistance.

When the metal in the metal-containing compound (b) is at least one selected from the group consisting of alkali metals, alkaline earth metals, aluminum, titanium, and zinc, the compound (a) can be strongly adsorbed on the coated metal surface. When the at least one of the hydrocarbon groups with 4 to 30 carbon atoms has one or more branched chains or one or more carbon-carbon double bonds, orientation of hydrocarbon groups is suppressed and crystallinity is reduced. This results in improved compatibility with the compound (c). When a mass ratio ((a)+(b)):(c) of the total of the compound (a) and the compound (b) to the compound (c) is within a range of 98:2 to 30:70, the composition has an excellent balance between the effect of making the cured product difficult to melt at high temperatures and the effect to suppress the corrosion of the metal surface due to the strong adsorption force to the metal surface. Further, when the composition contains a lubricating base oil (e) in amount of 10 to 90 mass % with respect to the total amount of the composition, coating properties of the present protection composition at room temperature is improved.

In the terminal-fitted electric wire of the present application, an electric connection part between the terminal and the electric conductor is covered with the cured product of the surface protection composition. Thus, the terminal-fitted electric wire has an excellent anticorrosion performance to prevent the metal corrosion and also has excellent coating properties and heat resistance.

DESCRIPTION OF EMBODIMENTS

Figure 1:
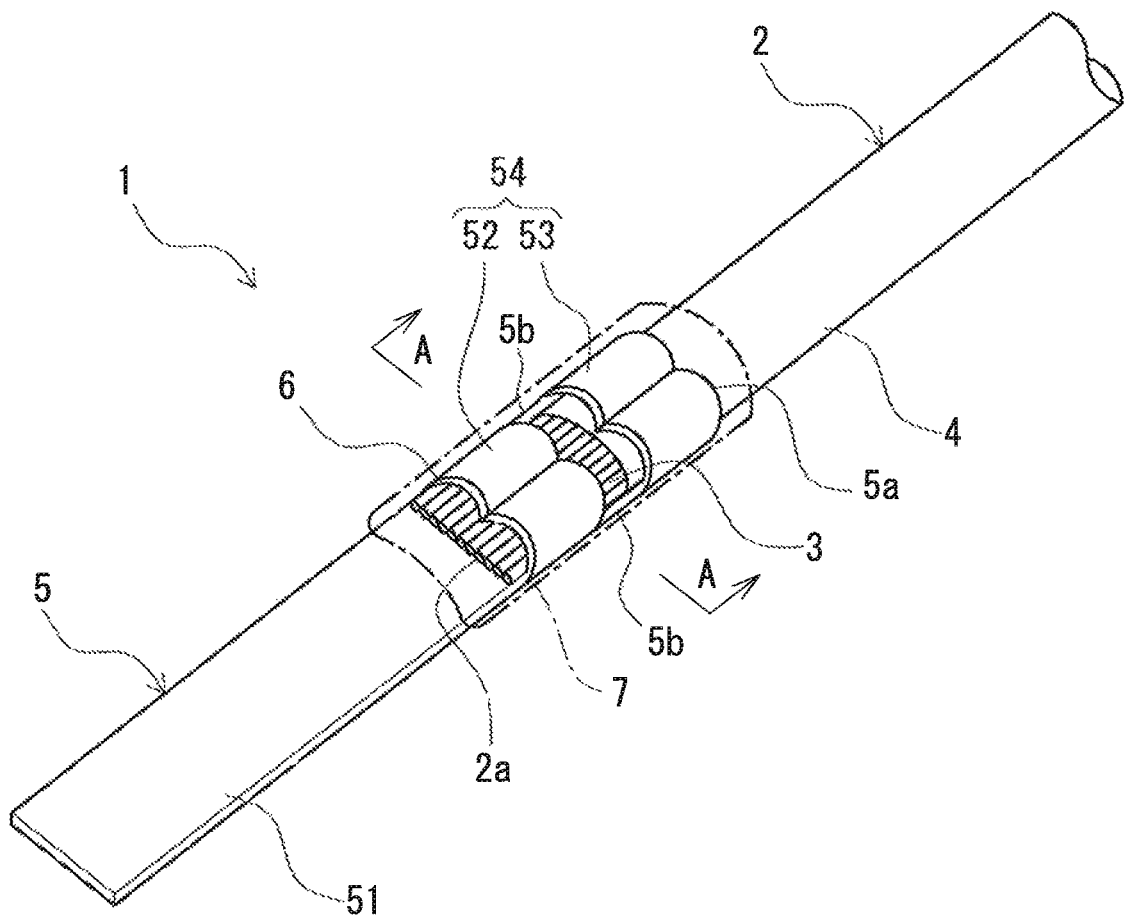
FIG. 1 is a perspective view of a terminal-fitted electric wire according to a preferred embodiment of the present application.

Next, a preferred embodiment of the present application is to be described in detail.

The surface protection composition of the present application (hereinafter sometimes referred to as the present protection composition) contains the bellow-described compounds (a) to (d). The present protectant composition may be prepared by adding the bellow-described compound (e) in addition to the bellow-described compounds (a) to (d).

The compound (a) is a phosphorus compound represented by the following general formula (1). The phosphorus compound has a low-polarity portion (i.e., lipophilic portion) composed of hydrocarbon groups and a high-polarity portion containing a phosphate group, as represented by the following general formula (1).

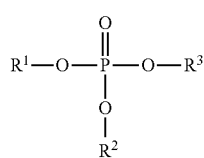

(1)

In the above-presented general formula (1), $R^1$ represents a hydrogen atom, $R^2$ represents a hydrocarbon group having 4 to 30 carbon atoms, and $R^3$ represents a hydrogen atom or a hydrocarbon group having 4 to 30 carbon atoms.

Examples of the hydrocarbon groups include an alkyl group, a cycloalkyl group, an alkyl-substituted cycloalkyl group, an alkenyl group, an aryl group, an alkyl-substituted aryl group, and an arylalkyl group. Among these, an alkyl group, a cycloalkyl group, an alkyl-substituted cycloalkyl group and an alkenyl group, which are aliphatic hydrocarbon groups and alicyclic hydrocarbon groups, are preferable. When each of the hydrocarbon groups of the compound (a) is an aliphatic hydrocarbon group or an alicyclic hydrocarbon group, the compatibility with the lubricating base oil (e), if contained in the composition, is improved.

The alkyl group may be linear or branched. Examples of the alkyl group include butyl group, isobutyl group, tert-butyl group, pentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, octadecyl group (i.e., stearyl group), isostearyl group, butyloctyl group, myristyl group, isomyristyl group, isocetyl group, hexyldecyl group, octyldecyl group, octyldodecyl group, behenyl group, and isobehenyl group.

Examples of the cycloalkyl group include cyclopentyl group, cyclohexyl group, and cycloheptyl group. Examples of the alkyl-substituted cycloalkyl group include a methylcyclopentyl group, a dimethylcyclopentyl group, a methylethylcyclopentyl group, a diethylcyclopentyl group, a methylcyclohexyl group, a dimethylcyclohexyl group, a methylethylcyclohexyl group, a diethylcyclohexyl group, a methylcycloheptyl group, and a dimethylcycloheptyl group, a methylethylcycloheptyl group, and a diethylcycloheptyl group. The substitution position of the alkyl-substituted cycloalkyl group is not particularly limited.

The alkenyl group may be linear or branched. Examples of the alkenyl group include butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, octadecenyl group, and oleyl group.

Examples of the aryl group include phenyl group and naphthyl group. Examples of the alkyl-substituted aryl group include a tolyl group, a xylyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group, and a dodecylphenyl group. The substitution position of the alkyl-substituted aryl group is not particularly restricted. The alkyl group of the alkyl-substituted aryl group may be linear or branched. Examples of the arylalkyl group include benzyl group, phenylethyl group, phenylpropyl group, phenylbutyl group, phenylpentyl group, and phenylhexyl group. The alkyl group of the arylalkyl group may be linear or branched.

In the compound (a), at least one of the hydrocarbon groups having 4 to 30 carbon atoms is preferably a hydrocarbon group having 8 to 30 carbon atoms. Further, in the compound (a), at least one of the hydrocarbon groups having 4 to 30 carbon atoms preferably has one or more branched chains or one or more carbon-carbon double bonds. When a hydrocarbon group in the compound (a) has branched chains or carbon-carbon double bonds, the orientation of the hydrocarbon groups is suppressed, and crystallinity is reduced. This results in improved compatibility with the compound (c), which has a hydrocarbon chain. When the lubricating base oil (e) is contained in the composition, compatibility with the lubricating base oil (e) is also improved.

Specific examples of the phosphorus compound represented by the above-presented general formula (1) include butyloctyl acid phosphate, isomyristyl acid phosphate, isocetyl acid phosphate, hexyldecyl acid phosphate, and isostearyl acid phosphate, isobehenyl acid phosphate, octyldecyl acid phosphate, octyldodecyl acid phosphate, isobutyl acid phosphate, 2-ethylhexyl acid phosphate, isodecyl acid phosphate, lauryl acid phosphate, tridecyl acid phosphate, stearyl acid phosphate, oleyl acid phosphate, myristyl acid phosphate, palmityl acid phosphate, dibutyl octyl acid phosphate, diisomyristyl acid phosphate, diisocetyl acid phosphate, dihexyl decyl acid phosphate, disostearyl acid phosphate, diisobehenyl acid phosphate, dioctyldecyl acid phosphate, dioctyldodecyl acid phosphate, diisobutyl acid phosphate, di-2-ethylhexyl acid phosphate, diisodecyl acid phosphate, ditridecyl acid phosphate, dioleyl acid phosphate, dimyristyl acid phosphate, and dipalmityl acid phosphate.

The present protection composition contains the compound (a) in an amount of 0.1 to 10 mass % in terms of phosphorus element with respect to the total amount of the composition. If the amount of the compound (a) is smaller than in an amount of 0.1 mass % in terms of phosphorus element with respect to the total amount of the composition, the surface protection composition has weak adsorption force to the metal surface and has low effect of suppressing corrosion of the metal surface. On the other hand, if the amount of the compound (a) is larger than 10 mass %, the amount of the compound (c) which can be contained in the composition is accordingly too small to form a gel with a high melting point and sufficient heat resistance even when the surface protection composition is cured by irradiated with light. From the viewpoint of adsorption force on the metal surface, the present protection composition more preferably contains the compound (a) in an amount of 0.5 mass % or larger, and even more preferably in an amount of 1.0 mass % or larger in terms of phosphorus element with respect to the total amount of the composition. On the other hand, from the viewpoint of the heat resistance, the present protection composition more preferably contains the compound (a) in an amount of 8.0 mass % or smaller, and even more preferably in an amount of 5.0 mass % or smaller in terms of phosphorus element with respect to the total amount of the composition.

The compound (b) is a metal-containing compound or an amine compound. These may be used alone, or two or more of them may be used in combination. On the metal surface covered with the surface protection composition, the compound (b) promotes ionization of metal atoms at the metal surface and thus enhances adsorption of the phosphorus compound on the metal surface. Thus, the present protection composition is adsorbed on the metal surface. Examples of the metal-containing compound include a metal hydroxide and a metal oxide.

Examples of the metal of the metal-containing compound include alkali metals such as Li, Na, and K, alkaline earth metals such as Mg and Ca, aluminum, titanium, and zinc. These may be used alone, or two or more of them may be used in combination. These metals have relatively high ionization tendency. Thus, ionization of the metal atoms at the metal surface is promoted and the phosphorus compound can be strongly adsorbed on the metal surface.

The metal in the metal-containing compound preferably has a valence of two or higher like alkaline earth metals, aluminum, titanium, and zinc from a viewpoint of hydrophilicity. From a viewpoint of water-resisting property, Ca and Mg are more preferable.

The present protection composition contains the metal-containing compound in an amount of 0.1 to 10 mass % in terms of the metal element with respect to the total amount of the composition. If the amount of the metal-containing compound is smaller than 0.1 mass % in terms of a metal element with respect to the total amount of the composition, the adsorption force of the compound (a) through formation of an ionic bond is reduced. Thus, the effect to suppress corrosion of the metal surface would be low. On the other hand when the amount of the metal-containing compound is larger than 10 mass % in terms of the metal element with respect to the total amount of the composition, an excess of the metal-containing compound significantly affects and impairs the protection effect of the composition. Further, from a viewpoint of adsorption of the phosphorus compound, the present protection composition more preferably contains the metal-containing compound in an amount of 0.5 mass % or larger, and even more preferably in an amount of 1.0 mass % or larger in terms of the metal element with respect to the total amount of the composition. On the other hand, the present protection composition more preferably contains the metal-containing compound (a) in an amount of 8.0 mass % or smaller, and even more preferably in an amount of 5.0 mass % smaller in terms of the metal element with respect to the total amount of the composition.

Examples of the amine compound include an organic amine compound having a hydrocarbon group having 2 to 100 carbon atoms, and more are preferably an organic amine compound having a hydrocarbon group having 2 to 22 hydrocarbon atoms. From a viewpoint of oxidation stability, the organic amine compound still more preferably has a hydrocarbon group having eight or more carbon atoms. The organic amine compounds may be any of primary, secondary and tertiary organic amine compounds.

More specific examples of the amine compound include octylamine, laurylamine, myristylamine, stearylamine, behenylamine, oleylamine, tallow alkylamine, cured tallow alkylamine, aniline, benzylamine, cyclohexylamine, diethylamine, dipropylamine, dibutylamine, diphenylamine, dibenzylamine, dicyclohexylamine, triethylamine, tributylamine, dimethyloctylamine, dimethyldecylamine, dimethylstearylamine, dimethyl tallow alkylamine, dimethyl-cured tallow alkylamine, and dimethyloleylamine. These may be used alone, or two or more of them may be used in combination. Octylamine and stearylamine are preferred among these.

The present protection composition contains the amine compound in an amount of 0.1 to 5.0 mass % in terms of nitrogen element with respect to the total amount of the composition. When the amount of the amine compound is smaller than 0.1 mass % in terms of nitrogen element with respect to the total amount of the composition, the adsorption force of the compound (a) through formation of an ionic bond is reduced. Thus, the effect to suppress the corrosion of the metal surface would be low. On the other hand, when the amount of the amine compound is larger than 5.0 mass % in terms of nitrogen element with respect to the total amount of the composition, an excess of the amine compound affects and impairs the protection effect of the composition. Further, from a viewpoint of the adsorption of the phosphorus compound (a), the present protection composition more preferably contains the amine compound in an amount of 0.3 mass % or larger, and even more preferably in an amount of 0.5 mass % or larger in terms of nitrogen element with respect to the total amount of the composition. The present protection composition more preferably contains the amine compound in an amount of 3.0 mass % or smaller, and even more preferably in an amount of 2.0 mass % smaller in terms of nitrogen element with respect to the total amount of the composition.

The compound (c) is a (meth)acrylate having two or more carbon-carbon double bonds and a hydrocarbon chain having four or more carbon atoms. Many of (meth)acrylates which can be used as the compound (c) are liquid at room temperature. Further, the compound (c) has high compatibility with the compound (a), which has a hydrocarbon group having four or more carbon atoms, since the compound (c) has the hydrocarbon group having four or more carbon atoms. Thus, the present protection composition is easy to be applied even at room temperature and has excellent coating properties. Further, since the compound (c) has two or more carbon-carbon double bonds, the compound (c) forms a three-dimensional structure through photopolymerization and becomes difficult to melt at a high temperature. Since the compound (a) has excellent compatibility with the compound (c), the compound (a) is held in the polymerized product of the compound (c), which prevents the composition from flowing out at a high temperature. As a result, the cured product of the present protection composition is difficult to melt at a high temperature and has excellent heat resistance.

Carbon-carbon double bonds in the compound (c) may be carbon-carbon double bond in a (meth)acryloyl group and in an alkenyl group. The (meth)acrylate (c) may be a monofunctional (meth)acrylate having an alkenyl group. Alternatively, regardless of whether or not the (meth)acrylate has an alkenyl group, the (meth)acrylate may be a bifunctional or higher functional (meth)acrylate. The (meth)acrylate includes either one or both of an acrylate and a methacrylate.

In the compound (c), the hydrocarbon chain having four or more carbon atoms may be linear, branched, or cyclic. The composition may also have one or more carbon-carbon double bonds. The hydrocarbon chain having four or more carbon atoms preferably has eight or more carbon atoms. On the other hand, the hydrocarbon chain preferably has 30 or less carbon atoms, and more preferably has 22 or less carbon atoms. Examples of the hydrocarbon chain having four or more carbon atoms include an alkyl chain, a cycloalkyl chain, an alkyl-substituted cycloalkyl chain, an alkenyl chain, an aryl chain, an alkyl-substituted aryl chain, and an arylalkyl chain. Among these, an alkyl chain, a cycloalkyl chain, an alkyl-substituted cycloalkyl chain, and an alkenyl chain, which are aliphatic hydrocarbon chains and alicyclic hydrocarbon chains, are preferable.

Examples of the (meth)acrylate (c) include monofunctional (meth)acrylates such as dicyclopentenyl (meth)acrylate and dicyclopentenyloxyethyl (meth)acrylate, and polyfunctional (meth)acrylates such as butanediol di(meth)acrylate, hexanediol di(meth)acrylate, nonanediol di(meth)acrylate, decanediol di(meth)acrylate, 2-butyl-2-ethyl-1,3-propanediol di(meth)acrylate, tricyclodecane dimethanol di(meth)acrylate, neopentyl glycol di(meth)acrylate, di(meth)acrylate of EO modified bisphenol A, di(meth)acrylate of EO or PO modified hydrogenated bisphenol A, bis [4-(2-acryloyloxyethoxy)phenyl]fluorene, trimethylolpropane tri(meth)acrylate, and pentaerythritol tri(meth)acrylate. These may be used alone as the compound (c) or may be used in combination of two or more.

The present protection composition contains the compound (c) in an amount of 1.0 to 70 mass % with respect to the total amount of the composition. If the amount of the compound (c) is smaller than 1.0 mass % with respect to the total amount of the composition, the compound (c) provides only low effect to prevent the cured product of the present protection composition from melting at a high temperature. On the other hand, if the amount of the compound (c) is larger than 70 mass %, the amount of the compound (a) which can be contained in the composition is accordingly too small, whereby the present protection composition would have weak adsorption force to the metal surface and have low effect to prevent corrosion of the metal surface. To be difficult to melt at a high temperature, the present protection composition preferably contains the compound (c) in an amount of 5.0 mass % or larger with respect to the total amount of the composition, and more preferably in an amount of 10 mass % or larger. From a viewpoint of the adsorption force to the metal surface, the present protection composition more preferably contains the compound (c) in an amount of 50 mass % or smaller, and even more preferably in amount of 30 mass % or smaller.

When the amount of the compound (c) is described in relation to the amount of the compounds (a) and (b), it is preferable that the mass ratio ((a)+(b)):(c) of the total of the compounds (a) and (b) to the compound (c) is within the range of 98:2 to 30:70. When the amount of the compound (c) with respect to the total of the compounds (a) to (c) is 2.0 mass % or larger, or when the amount of compounds (a) and (b) with respect to the total of the compounds (a) to (c) is in an amount of 98 mass % or smaller, an excellent effect is provided to prevent the cured product of the present protection composition from melting at a high temperature. From this viewpoint, the amount of the compound (c) with respect to the total of the compounds (a) to (c) is more preferably 5.0 mass % or larger, still more preferably 10 mass % or larger, and even more preferably 20 mass % or larger. On the other hand, when the amount of the compound (c) with respect to the total of the compounds (a) to (c) is 70 mass % or smaller, or when the amount of compounds (a) and (b) with respect to the total of the compounds (a) to (c) is 30 mass % or larger, the surface protection composition exhibits strong adsorption force and an excellent effect is provided to prevent the corrosion at the metal surface. From this viewpoint, the amount of the compound (c) with respect to the total of the compounds (a) to (c) is more preferably 60 mass % or smaller, and even more preferably 50 mass % or smaller.

The compound (d) is a photopolymerization initiator. The compound (d) is not particularly restricted as long as it is a compound that absorbs light such as ultraviolet to initiate radical polymerization. Conventionally known compounds can be used as the compound (d). Examples of the compound (d) include 1-hydroxycyclohexyl phenyl ketone, 2,2-dimethoxy-2-phenylacetophenone, xanthone, fluorenone, benzaldehyde, anthraquinone, ethylanthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, and bis-(2,6-dimethoxybenzoyl)-2,4,4-trimethylpentylphosphine oxide. These may be used alone as the compound (d) or may be used in combination of two or more. Examples of the compound (d) include commercially available products such as IRGACURE 184, 369, 651, 500, 907, CGI1700, CGI1750, CGI1850, and CG24-61; Darocure 1116 and 1173; Lucirin TPO (all product names of BASF Corporation); and Ebecryl P36 (product name from UCB, Inc.). The present composition contains the compound (d) in an amount of 0.1 to 10 mass % with respect to the total amount of the composition.

The compound (e) is a lubricating base oil. When the present protection composition contains the compound (e), coating properties of the present protection composition can be improved at room temperature. The present protection composition preferably contains the compound (e) in an amount of 10 to 90 mass % with respect to the total amount of the composition, and more preferably in an amount of 30 to 70 mass %.

The lubricant base oil used herein includes any one of a mineral oil, a wax isomerized oil, and a synthetic oil, which are usually used as base oils of lubricant oils. They may be used alone or two or more of them may be used in combination. Specific examples of the mineral oil include paraffinic and naphthenic oils, and n-paraffin, which are purified from lubricant oil fractions obtained by distillation under ordinary pressure or distillation under reduced pressure of crude oils by appropriately combining purification treatments such as solvent deasphalting, solvent extraction, hydrocracking, solvent dewaxing, catalytic dewaxing, hydrorefining, sulfuric acid cleaning, and white clay treatment of a lubricant oil fractions.

The isomerized oils used herein include those prepared through a hydrogen isomerization treatment of a wax raw material, such as natural wax, e.g., petroleum slack wax obtained through solvent dewaxing of a hydrocarbon oil, or a synthetic wax formed through the so-called Fischer Tropsch synthetic process, in which a mixture of carbon monoxide and hydrogen is brought in contact with a suitable synthetic catalyst at a high temperature and a high pressure. In the case of using the slack wax as the wax raw material, since the slack wax contains large amounts of sulfur and nitrogen, which are unnecessary in the lubricant base oil, it is desirable that the slack wax is hydrogenated as needed to prepare a wax raw material reduced in the sulfur content and the nitrogen content.

Although not particularly limited, examples of the synthetic oil include a poly-α-olefin, such as 1-octene oligomer, 1-decene oligomer, and ethylene-propylene oligomer and a hydrogenated product thereof, isobutene oligomer and a hydrogenated products thereof, isoparaffin, alkylbenzene, alkylnaphthalene, diester (for example, ditridecyl glutarate, di-2-ethylhexyl adipate, diisodecyl adipate, ditridecyl adipate, and di-2-ethylhexyl sebacate), polyol ester (for example, trimethylolpropane caprylate, trimethylolpropane pelargonate, pentaerythritol-2-ethylhexanoate, and pentaerythritol pelargonate), polyoxyalkylene glycol, dialkyl diphenyl ether, and polyphenyl ether.

Although the kinematic viscosity of the lubricant base oil is not particularly limited, usually the kinematic viscosity is preferably in the range of 1 to 150 mm$^2$/s at 100° C. The kinematic viscosity at 100° C. is more preferably within a range of 2 to 130 mm$^2$/s because the volatility and the handleability in production are excellent. The kinematic viscosity is measured according to JIS K 2283.

To the present protection composition, an addictive such as a stabilizer, a corrosion inhibitor, a dye, a viscosity improver, and a filler can be added as long as the function of the present protection composition is not deteriorated.

The present protection composition may be prepared by mixing of the compounds (a) to (d) all together, or may be prepared by addition of the compounds (c) and (d) to a mixture of the compounds (a) and (b). When the present protection composition contains the compound (e) and/or additives, the protection composition may be prepared by mixing of the compounds (a) to (d) and the additives all together, or may be prepared by addition of the compounds (c) to (e) and the additives to a mixture of the compounds (a) and (b).

The surface of a material to be coated can be coated with the present protection composition by application of the present protection composition onto the surface of the material or immersion of the material into the present protection composition. Examples of the material to be coated include metal materials. Examples of the metal species of the metal materials include Cu, Cu alloys, Al, Al alloys, metal materials having various plated layers on these materials, which are preferably used for terminal fittings, wire conductors, etc. The present protection composition can be cured by irradiation of light such as ultraviolet after coating of the surface of the metal to be coated. Thus, the surface of the metal to be coated is covered with the cured product of the present protection composition. The film thickness of the cured product of the present protection composition is not particularly restricted and may be adjusted to about 0.5 to 100 μm.

As described above, the present protection composition contains (a) the phosphorus compound, (b) the metal-containing compound or the amine compound. Thus the present composition can be adsorbed on the covering metal surface and has an excellent anticorrosion property to prevent the metal corrosion. Further, the present protection composition contains (c) the (meth)acrylate and (d) the photopolymerization initiator. Thus the present protection composition has excellent coating properties by being liquid before photocuring, and further has excellent heat resistance by forming a polymerized product. Further, since each of the compound (a) and the compound (c) has hydrocarbon group(s) having four or more carbon atoms, the composition has high compatibility between the compound (a) and the compound (c) and has high uniformity. Thus, the composition has an excellent anticorrosion property to prevent metal corrosion and excellent coating properties and heat resistance.

The present protection composition can be used for anticorrosion. For example, the present protection composition can be used to cover a surface of a metal part to be protected with closely contacting the surface, thereby preventing corrosion of the metal part. For example, a terminal-fitted electric wire may be covered with the present protection composition for preventing corrosion.

Next, a terminal-fitted electric wire of the present application is to be described.

A terminal-fitted electric wire of the present application contains a insulated wire and a terminal connected to an end of the conductor of the insulated wire. An electric connection part between the terminal and the conductor is covered with a cured product of the surface protection composition.

Figure 2:
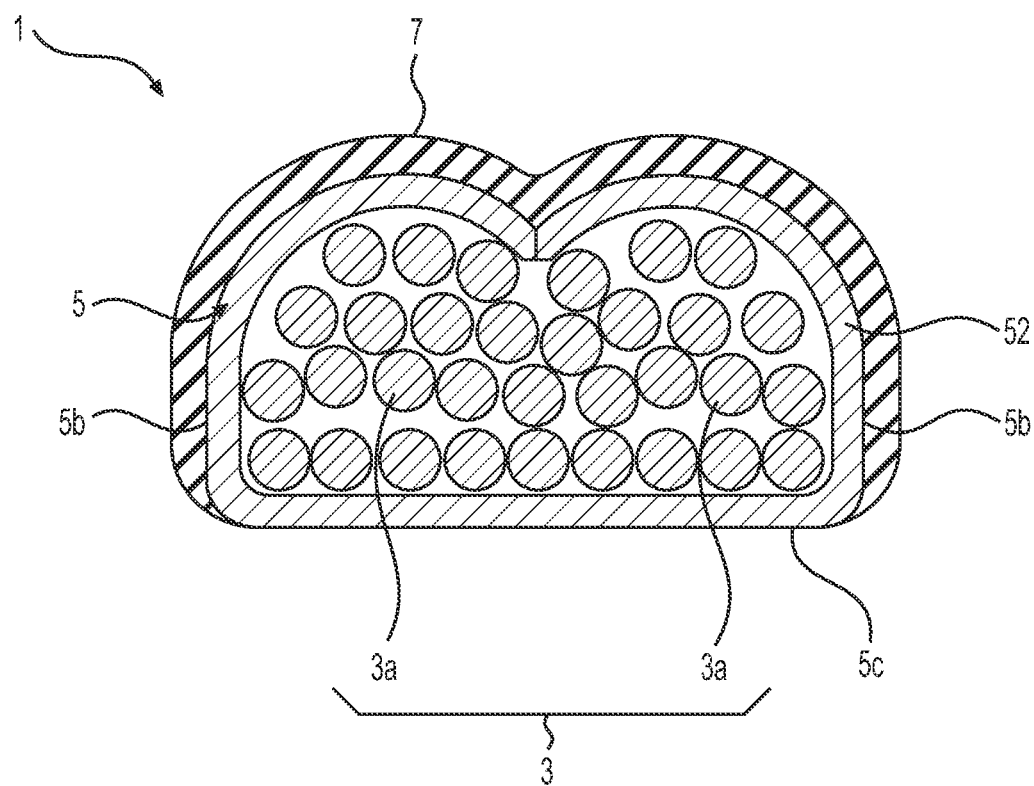
FIG. 2 is a longitudinal cross sectional view along line A-A in FIG. 1.

FIG. 1 is a perspective view of a terminal-fitted electric wire of a preferred embodiment of the present application, and FIG. 2 is a vertical cross sectional view along line A-A in FIG. 1. As illustrated in FIG. 1 and FIG. 2, a terminal-fitted electric wire 1 contains a covered electric wire 2 which contains an electric wire conductor 3 and an insulation covering (i.e., insulator) 4. The covered electric wire 2 and a terminal 5 are electrically connected through an electric connection part 6.

The terminal 5 has a tab-shaped connection part 51 formed as an elongate flat plate to be connected with a mating terminal, and an electric wire fixing part 54 containing a wire barrel 52 and an insulation barrel 53 formed at the extended end of the connection part 51. The terminal 5 can be formed (or fabricated) to a predetermined shape by pressing of a plate material made of a metal.

In the electric connection part 6, the insulation covering 4 at the end of the covered electric wire 2 is stripped off to expose the electric wire conductor 3, and the exposed electric wire conductor 3 is press-bonded to one side of the terminal 5 to connect the covered electric wire 2 with the terminal 5. The wire barrel 52 of the terminal 5 is crimped over the electric wire conductor 3 of the covered electric wire 2 to electrically connect the electric wire conductor 3 with the terminal 5. Further, the insulation barrel 53 of the terminal 5 is crimped over the insulation covering 4 of the covered electric wire 2.

In the terminal-fitted electric wire 1, an area surrounded by a dotted chain in FIG. 1 is covered with a cured product 7 of the present protection composition. Specifically, an area from the surface part of the terminal 5 ahead of the front end of the electric wire conductor 3 exposed from the insulation covering 4 to the surface part of the insulation covering 4 behind the backward end of the electric wire conductor 3 exposed from the insulation covering 4 is covered with the cured product 7. That is, the covered electric wire 2 is covered with the cured product 7 such that on the distal end 2a of the wire 2, the cured product 7 slightly extends off toward the connection part 51 of the terminal 5 from the distal end of the electric wire conductor 3. The terminal 5 is covered with the cured product 7 such that on the distal end 5a of the terminal 5, the cured product 7 slightly extends off toward the insulation covering 4 of the covered electric wire 2 from the end part of the insulation barrel 53. As shown in FIG. 2, side surfaces 5b of the terminal 5 are also covered with the cured product 7. A back surface 5c of the terminal 5 may not be covered with the cured product 7 or may be covered with the cured product 7. The peripheral edge of the cured product 7 includes a part in contact with the surface of the terminal 5, a part in contact with the surface of the electric wire conductor 3, and a part in contact with the surface of the insulation covering 4.

In this way, the electric connection part 6 is covered with the cured product 7 at a predetermined thickness along the shape of the outer periphery of the terminal 5 and the covered electric wire 2. Thus, a part of the electric wire 2 where the electric wire conductor 3 is exposed from the insulation covering 4 is completely covered with the cured product 7 so as not to be exposed to the outside. Accordingly, the electric connection part 6 is completely covered with the cured product 7. Since the cured product 7 has excellent adhesion to all of the electric wire conductor 3, the insulation covering 4, and the terminal 5, the cured product 7 prevents intrusion of moisture from the outside to the electric wire conductor 3 and the electric connection part 6, which may cause corrosion of the metal parts. Further, since the cured product 7 is excellent in adhesion, a gap is less likely to be formed between the cured product 7 and any of the electric wire conductor 3, the insulation covering 4, and the terminal 5 at the peripheral end of the cured product 7 even when the electric wire is bent, for example, in the processes from the production of the wire harness to the attachment to a vehicle, thereby maintaining the waterproofness and anticorrosion function.

The present protection composition forming the cured product 7 covers the predetermined area. For the application of the present protection composition forming the cured product 7, known methods such as dripping, and coating can be used.

The cured product 7 is formed at a predetermined thickness in a predetermined area. The thickness is, preferably, within a range of 0.01 to 0.1 mm. If the cured product 7 is excessively thick, it is difficult to insert the terminal 5 into a connector. On the other hand, if the cured product 7 is excessively thin, the anticorrosion function tends to be lowered.

The electric wire conductor 3 of the covered electric wire 2 is a stranded wire composed of a plurality of elemental wires 3a. In this case, the stranded wire may be composed of a single type of metal elemental wires or two or more types of metal elemental wires. Further, the stranded wire may also contain organic fibers in addition to metal elemental wires. The stranded wire composed of a single type of metal elemental wires means that all metal wires forming the stranded wire are formed of the same metal material, while the stranded wire composed of two or more types of metal elemental wires means that the stranded wire contains metal elemental wires formed of different metal materials. The stranded wire may also include reinforcing wires (i.e., tension members) for reinforcing the covered electric wire 2.

Examples of the material of metal elemental wires forming the electric wire conductor 3 include copper, copper alloys, aluminum, aluminum alloys, and materials having various types of plated layers on the metals described above. The material of the metal wires as the reinforcing wires includes, for example, copper alloys, titanium, tungsten, and stainless steels. Further, the organic fibers as the reinforcing wires may be, for example, KEVLAR. The metal elemental wires forming the electric wire conductor 3 are preferably made of aluminum, aluminum alloys or materials having various types of plated layers on the metals from a viewpoint of reducing the weight.

The material for the insulation covering 4 may be, for example, rubber, polyolefin, PVC, or a thermoplastic elastomer. They may be used alone or two or more of them may be used in combination. Various additives may be added as required to the material of the insulation covering 4. Examples of the additives include flame retardants, fillers, and colorants.

The material for the terminal 5 (i.e., material for a substrate) may be various copper alloys, copper, etc. in addition to generally used brass. The surface of the terminal 5 may be plated with various metals such as tin, nickel, and gold partially (for example, on an area including the contact surface) or entirely.

While a terminal is press-bonded to the end of the electric wire conductor in the terminal-fitted electric wire 1 illustrated in FIG. 1, other known electric connection methods such as welding may also be used instead of the press-bonding connection.

EXAMPLE

The embodiments of the present application are to be described by way of examples but the present application is not restricted to the examples.

Preparation of the Present Protection Composition

Example1

Calcium hydroxide was added to a methanol solution of oleyl acid phosphate. The mixture was stirred at room temperature, and the methanol was distilled off. Then, nonanediol diacrylate and a photopolymerization initiator were added to the mixture to prepare a surface protection composition according to Example 1. The content ratio of the compounds (in mass %) was as shown in Table 1.

Examples 2 to 13

Surface protection compositions according to Examples 2 to 13 were prepared in the same manner as in Example 1 with the content ratios (in mass %) shown in Table 1. In Examples 3 to 11 and 13, the lubricating base oil was further added to the composition. The composition according to Example 7 contained an amine compound instead of the metal-containing compound.

Comparative Example 1

A surface protection composition according to Comparative Example 1 was prepared in the same manner as the composition according to Example 3, which contained the lubricating base oil, except that the compound (a) or (b) was not added.

Comparative Examples 2 and 3

Surface protection compositions according to the Comparative Examples 2 and 3 were prepared in the same manner as the composition according to Example 3, which contained the lubricating base oil, except that the compound (c) or (d) was not added.

Comparative Examples 4 and 5

Surface protection compositions according to the Comparative Examples 4 and 5 were prepared in the same manner as the composition to Example 3, which contained the lubricating base oil, except that compound (×4) or (×5) was added in place of the compound (c).

Evaluation

State After UV Irradiation 0.05 g of each of the prepared surface protection compositions was dropped in a spot shape onto a copper plate of 2 cm×2 cm at room temperature, and then the surface of the coating film was irradiated with a UV lamp (100 mW/cm$^2$, manufactured by SEN Special Light Source Co., Ltd.) for 20 seconds. The state of the film after UV irradiation were evaluated by visual observation and finger touch. When the film was in the state of a uniform gel at room temperature, the composition was evaluated as "good", while when the film was in the state of a non-uniform gel or showed fluidity due to lack of gel formation, the composition was evaluated as "bad".

Dripping at 155° C.

Onto a position near one edge of a strip-shaped copper plate of 1 cm×5 cm, 0.05 g of each of the above-prepared surface protection compositions was dropped in a spot shape, and then the surface of the coating film was irradiated with a UV lamp (100 mW/cm$^2$, manufactured by SEN Special Light Source Co., Ltd.) for 20 seconds. Then, the copper plate was left for two hours in an oven heated at 155° C. in a vertical configuration with its edge near which the composition was placed held upward. The state of the coating film was evaluated by visual observation. If the coating film was not dripped from the edge near which the composition was placed, the composition was evaluated as "good". If the coating film was dripped, the composition was evaluated as "bad". Conditions such as the temperature were in accordance with JIS C60068-2-2.

Corrosion Current

A strip-shaped copper plate of 1 cm×5 cm was prepared, and a region of the plate of 2 cm from one edge was immersed into each of the above-prepared surface protection compositions at room temperature, and then the entire surface of the coating film was irradiated with a UV lamp (100 mW/cm$^2$, manufactured by SEN Special Light Source Co., Ltd.) for 30 seconds. The obtained test piece was defined as a test piece in the initial state. Another test piece forming a coating film in the same manner as the above-mentioned test piece in the initial state was hung in an oven heated at 155° C. and left for two hours, in a vertical configuration with its edge where the composition was placed held upward. The test piece prepared through this process was defined as a test piece after high temperature treatment. For measurement of the corrosion current, the region of the test piece in the initial state or after high temperature treatment covered with a coating film was used as a cathode electrode, and an aluminum plate separately prepared was used as an anode electrode. Both electrodes were immersed into an aqueous solution of 5% sodium chloride, and a potential difference between the electrodes (i.e., corrosion current) was measured. A smaller potential difference indicates that a larger portion of the coating film remains on the copper plate and that the coating film exhibits stronger adsorption to the surface of the copper plate. On the other hand, a larger potential difference indicates that a smaller portion of the coating film remains on the copper plate and that the coating film exhibits weaker adsorption to the surface of the copper plate. When an untreated strip-shaped copper plate without immersed into the surface protection composition was used as a cathode electrode, the corrosion current of both the test piece in the initial state and the test piece after high temperature treatment was 80 μA. If the current measured with the test piece treated with the surface protection composition was smaller than ⅕ of the above-mentioned current value of 80 μA, the composition was evaluated as "good" in surface protection

TABLE 1

|  |  | Examples | | | | | | | | |
| --- | --- | --- | --- | --- | --- | --- | --- | --- | --- | --- |
|  |  | 1 | 2 | 3 | 4 | 5 | 6 | 7 | 8 | 9 |
| Compound (a) | (a1) | 56.2 | — | 28.1 | — | 28.1 | — | 22.2 | 28.1 | — |
|  | (a2) | — | 50.3 | — | 25.2 | — | — | — | — | 25.2 |
|  | (a3) | — | — | — | — | — | 27.0 | — | — | — |
| Compound (b) | (b1) | 6.8 | 12.7 | 3.4 | 6.4 | — | — | — | 3.4 | 6.4 |
|  | (b2) | — | — | — | — | 5.0 | 6.1 | — | — | — |
|  | (b3) | — | — | — | — | — | — | 9.3 | — | — |

TABLE 1-continued

|  |  |  |  |  |  |  |  |  |  |  |
|---|---|---|---|---|---|---|---|---|---|---|
| Compound (c) | (c1) | 37 | 37 | 17 | 17 | 17 | 17 | 17 | — | — |
|  | (c2) | — | — | — | — | — | — | — | 17 | 17 |
|  | (c3) | — | — | — | — | — | — | — | — | — |
|  | (x4) | — | — | — | — | — | — | — | — | — |
|  | (x5) | — | — | — | — | — | — | — | — | — |
| Comound (d) | (d1) | 2 | 2 | 2 | 2 | 2 | 2 | 2 | 2 | 2 |
|  | (d2) | 1 | 1 | 1 | 1 | 1 | 1 | 1 | 1 | 1 |
| Compound (e) | (e1) | — | — | 50 | 50 | 50 | 50 | 50 | 50 | 50 |
| P atoms in comp. (a) (mass %) |  | 3.8 | 4.7 | 1.9 | 2.4 | 1.9 | 1.9 | 1.5 | 1.9 | 2.4 |
| Metal in comp. (b) (mass %) |  | 3.9 | 7.3 | 2.0 | 3.7 | 2.8 | 3.4 | — | 2.0 | 3.7 |
| N atoms in comp. (b) (mass %) |  | — | — | — | — | — | — | 1.0 | — | — |
| ((a) + (b))/((a) + (b) + (c)) |  | 63% | 63% | 65% | 65% | 66% | 66% | 65% | 65% | 65% |
| Evaluation | State after UV irradiation | G | G | G | G | G | G | G | G | G |
|  | Dropping at 155° C. | G | G | G | G | G | G | G | G | G |
|  | Corrosion Initial State | 8.3 | 6.4 | 8.2 | 5.3 | 5.8 | 9.0 | 8.4 | 5.7 | 4.5 |
|  | current After high (µA) temp. tret. | 8.6 | 7.1 | 8.5 | 7.4 | 6.1 | 9.7 | 9.6 | 6.1 | 5.1 |

|  |  | Examples |  |  |  | Comparative Examles |  |  |  |  |
|---|---|---|---|---|---|---|---|---|---|---|
|  |  | 10 | 11 | 12 | 13 | 1 | 2 | 3 | 4 | 5 |
| Compound (a) | (a1) | — | — | — | — | — | 56.2 | 23.4 | 28.1 | 28.1 |
|  | (a2) | 25.2 | 84.5 | 28.2 | 2.5 | — | — | — | — | — |
|  | (a3) | — | — | — | — | — | — | — | — | — |
| Compound (b) | (b1) | 6.4 | 10.0 | 3.3 | 0.4 | — | 6.8 | 2.8 | 3.4 | 3.4 |
|  | (b2) | — | — | — | — | — | — | — | — | — |
|  | (b3) | — | — | — | — | — | — | — | — | — |
| Compound (c) | (c1) | — | — | — | — | 60 | — | 25 | — | — |
|  | (c2) | — | 3 | 67 | 12 | — | — | — | — | — |
|  | (c3) | 17 | — | — | — | — | — | — | — | — |
|  | (x4) | — | — | — | — | — | — | — | 17 | — |
|  | (x5) | — | — | — | — | — | — | — | — | 17 |
| Comound (d) | (d1) | 2 | 2 | 2 | 2 | 2 | 2 | — | 2 | 2 |
|  | (d2) | 1 | 1 | 1 | 1 | 1 | 1 | — | 1 | 1 |
| Compound (e) | (e1) | 50 | 4 | — | 84 | 37 | 37 | 50 | 50 | 50 |
| P atoms in comp. (a) (mass %) |  | 2.4 | 7.8 | 2.7 | 0.2 | 0.0 | 3.8 | 1.6 | 1.9 | 1.9 |
| Metal in comp. (b) (mass %) |  | 3.7 | 5.7 | 1.9 | 0.2 | — | 3.9 | 1.7 | 2.0 | 2.0 |
| N atoms in comp. (b) (mass %) |  | — | — | — | — | — | — | — | — | — |
| ((a) + (b))/((a) + (b) + (c)) |  | 65% | 97% | 32% | 20% | 0% | 100% | 51% | 65% | 65% |
| Evaluation | State after UV irradiation | G | G | G | G | G | B | B | G | B |
|  | Dropping at 155° C. | G | G | G | G | G | B | B | B | B |
|  | Corrosion Initial State | 5.1 | 4.4 | 8.2 | 8.4 | 65.5 | 5.6 | 7.4 | 6.5 | 9.4 |
|  | current After high (µA) temp. tret. | 8.4 | 8.9 | 8.8 | 8.9 | 70.2 | 28.1 | 38.9 | 54.1 | 40.1 |

G: Good, B: Bad
Comound (a1): Oleyl acid phosphate
Compound (a2): 2-Ethylhexyl acid phosphate
Compound (a3): Stearyl acid phosphate
Compound (b1): Calcium hydroxide
Compound (b2): Basis zinc carbonate
Compound (b3): Octylamine
Compound (e1): Mineral base oil (kinematic viscosity: 30 mm$^2$/s at 100° C.)
Compound (c1): Nonanediol diacrylate
Compound (c2): Tricyclodecane dimethanol diacrylate
Compound (c3): Neopentyl glycol diacrylate
Compound (x4): Isobornyl acrylate
Compound (x5): Tetraethylene glycol diacrylate
Comound (d1): Photopolymerization initiator IRGACURE 184 (BASF Corporation)
Comound (d2): Photopolymerization initiator IRGACURE TPO (BASF Corporation)

The surface protection compositions according to Examples, containing the compounds (a) to (d) at specific ratios, were applied uniformly to the plate surface at room temperature, and immediately formed uniform cured products (i.e., gels) by UV irradiation. Further no dripping of the composition from the copper plate was not observed in the both cases of the test pieces in the initial state and the test piece after high temperature treatment (left for 2 hours at 155° C.), and the corrosion current maintained low values. That is, it was confirmed that the anticorrosion property of the compositions to prevent metal corrosion was excellent, and the coating property and heat resistance thereof were also excellent.

The surface protection composition according to Comparative Example 1 did not contain the compound (a) or (b). The composition showed a high value of corrosion current even in the initial state, which indicates the composition was not adsorbed on the metal surface and had inferior anticorrosion property to prevent metal corrosion, although the composition was applied on the surface uniformly and formed the cured products (i.e. gels) with heat resistance after UV irradiation. The surface protection compositions according to Comparative Examples 2 to 3 did not contain the compound (c) or (d). The compositions did not form cured products (i.e. gels) with heat resistance after UV irradiation although the compositions were applied on the surface uniformly. Further, the corrosion current was high after the high temperature treatment though being low in the initial state, which indicates the compositions had inferior anticorrosion properties to prevent metal corrosion. Since the surface protection composition according to Comparative Example 4 contained isobornyl acrylate, which does not have two or more carbon-carbon double bonds, instead of the compound (c), the cured product (i.e. gel) after UV irradiation had a low melting point. Thus, dripping was observed at 155° C., and the corrosion current was high, which indicated an inferior anticorrosion property to prevent metal corrosion. The surface protection composition according to Comparative Example 5 contained tetraethylene glycol diacrylate, which does not have hydrocarbon chains having four or more carbon atoms, instead of the compound (c). The composition showed low compatibility between the compounds (a) and (c), and did not form a cured product (i.e. gel) uniformly. Thus dripping was observed at 155° C., and the corrosion current was high, which indicated an inferior anticorrosion property to prevent metal corrosion.

The embodiments of the present application have been described specifically but the present application is no way restricted to the embodiment described above but can be modified variously within a range not departing from the gist of the present application.

This application claims priority based on Japanese Patent Application No. 2018-46112 filed on Mar. 14, 2018, the entire disclosure of which is incorporated herein by reference.

DESCRIPTION OF SYMBOLS

1 Terminal fitted electric wire
2 Electric wire
3 Electric wire conductor
4 Insulation covering (insulator)
5 Terminal
6 Electric connection part
7 Cured product

The invention claimed is:

1. A Surface protection composition comprising:
(a) a phosphorus compound represented by the following general formula (1) in an amount of 0.1 to 10 mass % in terms of phosphorus element with respect to the total amount of the composition,

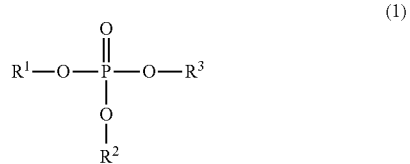

(1)

where $R^1$ represents a hydrogen atom, $R^2$ represents a hydrocarbon group having 4 to 30 carbon atoms, and $R_3$ represents a hydrogen atom or a hydrocarbon group having 4 to 30 carbon atoms;
(b) a metal-containing compound in an amount of 0.1 to 10 mass % in terms of a metal element with respect to the total amount of the composition, or an amine compound in an amount of 0.1 to 5.0 mass % in terms of nitrogen element with respect to the total amount of the composition;
(c) a (meth)acrylate having:
two or more carbon-carbon double bonds; and
a hydrocarbon chain having four or more carbon atoms,
in an amount of 1.0 to 70 mass % with respect to the total amount of the composition,
(d) a photopolymerization initiator in an amount of 0.1 to 10 mass % with respect to the total amount of the composition.

2. The surface protection composition according to claim 1, wherein the metal in the compound (b) is at least one selected from the group consisting of alkali metals, alkaline earth metals, aluminum, titanium, and zinc.

3. The surface protection composition according to claim 2, wherein at least one of the hydrocarbon groups having 4 to 30 carbon atoms in the compound (a) has one or more branched chains or one or more carbon-carbon double bonds.

4. The surface protection composition according to claim 3, wherein a mass ratio ((a)+(b)):(c) of the total of the compound (a) and the compound (b) to the compound (c) is within a range of 98:2 to 30:70.

5. The surface protection composition according to claim 4, further comprising 10 to 90 mass % of a lubricating base oil (e) with respect to the total amount of the composition.

6. The surface protection composition according to claim 5, wherein each of the hydrocarbon groups in the general formula (1) is an aliphatic hydrocarbon group or an alicyclic hydrocarbon group.

7. The surface protection composition according to claim 6, wherein the compound (c) is a polyfunctional (meth)acrylate comprising an aliphatic or alicyclic hydrocarbon chain with 8 to 22 carbon atoms.

8. A terminal-fitted electric wire comprising:
a terminal fitting;
an electric wire; and
an electric connection part between the terminal and the electric conductor, covered with a cured product of the surface protection composition according to claim 7.

9. The surface protection composition according to claim 1, wherein at least one of the hydrocarbon groups having 4 to 30 carbon atoms in the compound (a) has one or more branched chains or one or more carbon-carbon double bonds.

10. The surface protection composition according to claim 1, wherein a mass ratio ((a)+(b)):(c) of the total of the compound (a) and the compound (b) to the compound (c) is within a range of 98:2 to 30:70.

11. The surface protection composition according to claim 1, further comprising 10 to 90 mass % of a lubricating base oil (e) with respect to the total amount of the composition.

12. The surface protection composition according to claim 1, wherein each of the hydrocarbon groups in the general formula (1) is an aliphatic hydrocarbon group or an alicyclic hydrocarbon group.

13. The surface protection composition according to claim 1, wherein the compound (c) is a polyfunctional (meth)acrylate comprising an aliphatic or alicyclic hydrocarbon chain with 8 to 22 carbon atoms.

14. A terminal-fitted electric wire comprising:
a terminal fitting;
an electric wire; and
an electric connection part between the terminal and the electric conductor, covered with a cured product of the surface protection composition according to claim 1.

15. The terminal-fitted electric wire according to claim 14, wherein the compound (b) is an amine.

16. The surface protection composition according to claim 1, wherein the compound (b) is an amine.

\* \* \* \* \*